US009633090B2

(12) United States Patent
Duckworth et al.

(10) Patent No.: US 9,633,090 B2
(45) Date of Patent: Apr. 25, 2017

(54) DYNAMIC VISUALIZATION OF BIG DATA

(71) Applicant: International Business Machines Corporation, Armonk, NY (US)

(72) Inventors: William M. Duckworth, Sydney (AU); Kerrie L. Holley, Montara, CA (US); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/697,724

(22) Filed: Apr. 28, 2015

(65) Prior Publication Data

US 2016/0323443 A1 Nov. 3, 2016

(51) Int. Cl.
*H04M 3/00* (2006.01)
*G06F 17/30* (2006.01)
*G06F 17/27* (2006.01)
*G06T 11/60* (2006.01)
*H04M 3/42* (2006.01)
*H04M 3/51* (2006.01)

(52) U.S. Cl.
CPC .... *G06F 17/30554* (2013.01); *G06F 17/2785* (2013.01); *G06F 17/30592* (2013.01); *G06T 11/60* (2013.01); *H04M 3/42068* (2013.01); *H04M 3/5133* (2013.01)

(58) Field of Classification Search
CPC .. H04M 3/42221; H04M 3/51; H04M 3/5175; H04M 3/523; H04M 2203/551; H04M 3/5183
USPC ....................................................... 379/266.1
See application file for complete search history.

(56) References Cited

U.S. PATENT DOCUMENTS

| | | | |
|---|---|---|---|
| 6,169,534 B1* | 1/2001 | Raffel | G06Q 10/10 345/473 |
| 7,466,816 B2* | 12/2008 | Blair | H04M 3/42221 379/265.06 |
| 8,295,820 B2 | 10/2012 | Gottfried | |
| 8,767,948 B1* | 7/2014 | Riahi | G06N 99/005 379/265.02 |
| 9,245,257 B2 | 1/2016 | McConnell | |
| 2008/0195429 A1* | 8/2008 | Hoff | G06Q 10/00 705/7.13 |
| 2011/0129077 A1 | 6/2011 | Prakash et al. | |
| 2013/0268656 A1 | 10/2013 | Bott | |
| 2013/0326347 A1 | 12/2013 | Albright et al. | |
| 2013/0326605 A1 | 12/2013 | Betz et al. | |
| 2014/0115514 A1* | 4/2014 | Hackborn | G06F 3/0481 715/771 |

(Continued)

OTHER PUBLICATIONS

IBM: List of IBM Patents or Patent Applications Treated As Related (Appendix P), Feb. 9, 2016, pp. 1-2.

(Continued)

*Primary Examiner* — Quoc D Tran
(74) *Attorney, Agent, or Firm* — Erik K. Johnson (57) ABSTRACT

Dynamic visualization of big data is provided. Data describing a user is received from at least one of a plurality of data sources. One or more characteristics of the user are determined based, at least in part, on the data describing the user. One or more visual indicators are determined based, at least in part, on the one or more characteristics of the user. A visual representation of the user is presented. The visual representation is based, at least in part, on the one or more visual indicators.

14 Claims, 4 Drawing Sheets

(56) References Cited

U.S. PATENT DOCUMENTS

| | | | | |
|---|---|---|---|---|
| 2014/0132390 A1* | 5/2014 | Loveland | ........... | H05B 37/0227 340/5.8 |
| 2014/0282098 A1* | 9/2014 | McConnell | ........ | G06Q 10/0639 715/753 |
| 2014/0297363 A1 | 10/2014 | Vemana | | |
| 2014/0364097 A1* | 12/2014 | Bauer | ..................... | H04W 4/16 455/414.3 |

OTHER PUBLICATIONS

Pending U.S. Appl. No. 15/041,069, filed Feb. 11, 2016, titled "Dynamic Visualization of Big Data," on pp. 1-25.

"Articles about language", Call Centre Helper, provided by inventors on Feb. 9, 2014, pp. 1-8, <http://www.callcentrehelper.com/tag/language>.

"Build a Simple iPhone App", Image Based Animation, Treehouse, provided by inventors on Feb. 9, 2014, pp. 1-2, <http://teamtreehouse.com/library/build-a-simple-iphone-app/animate-this/image-based-animation-2>.

"Image Based Language", provided by inventors on Feb. 9, 2014, last edited Dec. 15, 2014, pp. 1-2, <http://c2.com/cgi/wiki?ImageBasedLanguage>.

Lisetti et al., MAUI: a Multimodal Affective User Interface Sensing User's Emotions based on Appraisal Theory—Questions about Facial Expressions . . . , 1st Workshop of the EC Humaine Network of Excellence on Research on Emotions and Human-Machine Interaction. (Geneva, Switzerland, Jun. 2004), 4 pages.

Anand et al., "Data Warehouse Security Through Conceptual Models", International Journal of Scientific and Research Publications, vol. 4, Issue 6, Jun. 2014, pp. 1-4.

Connor, "Types and Polymorphism in Persistant Programming Systems", Ph.D. Thesis, University of St. Andrews (1990), pp. 1-175.

\* cited by examiner

DYNAMIC VISUALIZATION OF BIG DATA

BACKGROUND OF THE INVENTION

The present invention relates generally to the field of big data, and more particularly to providing dynamic visualization of big data.

Customer support services, emergency response services, and other services can use telecommunication technologies to communicate with a plurality of clients. Typically, a duration for a completed call (i.e., a tele-communicative interaction between a client and a service that has been appropriately handled by the service) is represented by an average handling time (AHT). The AHT for each of the plurality of clients that the service interacts with may depend on information provided to the service and the manner in which the information is provided.

SUMMARY

According to one embodiment of the present invention, a method for dynamic visualization of big data is provided. The method includes receiving, by one or more processors, data describing a user from at least one of a plurality of data sources; determining, by one or more processors, one or more characteristics of the user based, at least in part, on the data describing the user; determining, by one or more processors, one or more visual indicators based, at least in part, on the one or more characteristics of the user; and presenting, by one or more processors, a visual representation of the user, wherein the visual representation is based, at least in part, on the one or more visual indicators.

According to another embodiment of the present invention, a computer program product for dynamic visualization of big data is provided. The computer program product comprises a computer readable storage medium, and program instructions stored on the computer readable storage medium. The program instructions include: program instructions to receive data describing a user from at least one of a plurality of data sources; program instructions to determine one or more characteristics of the user based, at least in part, on the data describing the user; program instructions to determine one or more visual indicators based, at least in part, on the one or more characteristics of the user; and program instructions to present a visual representation of the user, wherein the visual representation is based, at least in part, on the one or more visual indicators.

According to yet another embodiment of the present invention, a computer system for dynamic visualization of big data is provided. The computer system includes one or more computer processors, one or more computer readable storage media, and program instructions stored on the computer readable storage media for execution by at least one of the one or more processors. The program instructions include: program instructions to receive data describing a user from at least one of a plurality of data sources; program instructions to determine one or more characteristics of the user based, at least in part, on the data describing the user; program instructions to determine one or more visual indicators based, at least in part, on the one or more characteristics of the user; and program instructions to present a visual representation of the user, wherein the visual representation is based, at least in part, on the one or more visual indicators.

DETAILED DESCRIPTION

Embodiments of the present invention provide methods for offering dynamic visualization of one or more characteristics of a client to a service. Embodiments of the present invention capture client information from data stores (e.g., customer databases and internal source call center logs) and translates the captured client information into dynamic visual representations of characteristics of the client. In this manner, as discussed in greater detail herein, embodiments of the present invention can be implemented by services (e.g., call centers, customer support services, support hotlines, and emergency response services), for example, to reduce an average handling time (AHT) for client interactions.

Figure 1:
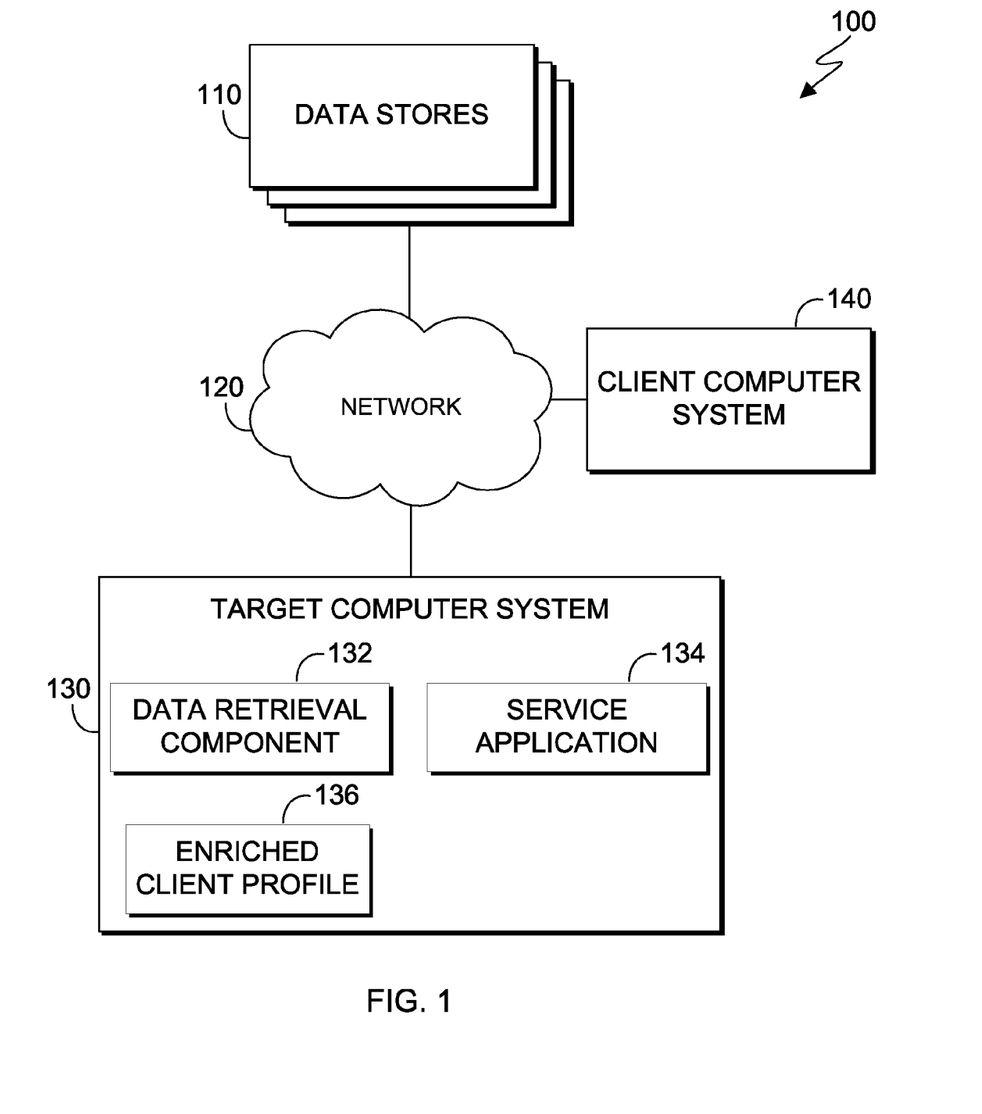
FIG. 1 is a block diagram of a computing environment, in accordance with an embodiment of the present invention.

FIG. 1 is a block diagram of computing environment 100, in accordance with an embodiment of the present invention. Computing environment 100 includes data stores 110, target computer system 130, client computer system 140, all interconnected by network 120.

Data stores 110 are accessible by target computer system 130 and client computer system 140 via network 120. Data stores 110 can comprise one or more data stores on one or more computer systems. In this embodiment, data stores 110 contain information used by client computer system 140 and target computer system 130. Examples of data stores which may be represented by data stores 110 include, but are not limited to, customer databases, internal source call center logs, network real time performance data, customer relationship management sources, social media databases, and combinations thereof. Furthermore, data stores 110 may also contain a translation map comprising one or more tables that associates characteristics of a user with visual indicators, as discussed in greater detail herein. Data stores 110 may be updated with information from big data sources automatically (e.g., once a day) and/or manually (e.g., user specification).

Network 120 can be, for example, a local area network (LAN), a wide area network (WAN) such as the Internet, or a combination of the two, and include wired, wireless, or fiber optic connections. In general, network 120 can be any combination of connections and protocols that will support communications between client computer system 140, target computer system 130, and data stores 110, in accordance with embodiments of the present invention.

Target computer system 130 includes data retrieval component 132, service application 134, and enriched client profile 136. Target computer system 130 receives information associated with a user of client computer system 140 (e.g., characteristics) from data stores 110. In this embodiment, users of target computer system 130 are one or more persons from a service. Examples of types of users of target computer system 130 include, but are not limited to, employees at call centers, dispatchers at emergency response services, and agents at customer support services. Target computer system 130 can be can be a desktop computer, laptop computer, specialized computer server, or any other computer system known in the art. In general, target computer system 130 is representative of any electronic device, or combination of electronic devices, capable of executing machine-readable program instructions, as described in greater detail with regard to FIG. 4.

Data retrieval component 132 retrieves information associated with a user of client computer system 140 from data stores 110. Data retrieval component 132 uses the retrieved information to create enriched client profile 136 by service application 134. In this embodiment, data retrieval component 132 is stored and executed on target computer system 130. In another embodiment, data retrieval component 132 may be stored and executed on another computer system separate from target computer system 130 (not depicted). Data retrieval component 132 may include one or more components that selectively retrieve information associated with a user of client computer system 140 (e.g., characteristics of the user). For example, a customer support service may use data retrieval component 132 to selectively retrieve information such as, logs of previous call history between a user of client computer system 140 and the customer support service, network and location information for a user of client computer system 140, social media information for a user of client computer system 140, and an internal customer profile (e.g., purchase history).

Service application 134 processes the retrieved information associated with a user of client computer system 140 from data retrieval component 132. In this embodiment, service application 134 uses a translation map to translate the retrieved information into one or more visual indicators (e.g., language representations, dynamic images, and interactive objects) for enriched client profile 136. Service application 134 creates enriched client profile 136 using stack tools (e.g., natural language processing tools or semantic analysis tools) to blend retrieved information associated with the user of client computer system 140. In this embodiment, service application 134 is stored and executed on target computer system 130. In another embodiment, service application 134 may be stored and executed on another computer system separate from target computer system 130 (not depicted). Service application 134 may include one or more components that process (e.g., consolidate or blend) information associated with the user of client computer system 140 to create enriched client profile 136.

Enriched client profile 136 provides a visual representation of information associated with a user of client computer system 140 to a user of target computer system 130. In this embodiment, enriched client profile 136 includes visual indicators that represent characteristics of the user of client computer system 140. A visual indicator is semantically related to the characteristic with which the visual indicator is associated. For example, a visual indicator is an image that depicts an object that suggests the characteristic. The characteristics of the user are determined based on information associated with the user of client computer system 140 from data stores 110. Furthermore, the visual indicators and representations may dynamically interact with each other. Examples of enriched client profile 136 are depicted in FIGS. 2A-2F, wherein each enriched client profile 136 comprises an avatar and one or more visual indicators. In some embodiments, enriched client profile 136 includes a client record plus (i.e., enriched with) characteristics of the user of client computer system 140.

Client computer system 140 is a computer system that exchanges information associated with a user of client computer system 140 with data stores 110 via network 120. Client computer system 140 may transmit information associated with the user of client computer system 140 automatically or upon request of the user of client computer system 140. For example, location information, network information, personal interests, social media updates, client information, and other types of information can be automatically transmitted to data stores 110, as described in greater detail with regard to FIG. 3. In another embodiment, an authorization may be provided by the user of client computer system 140, initiating transmission of information associated with the user of client computer system 140 to data stores 110. For example, a user of target computer system 130 (e.g., a support service employee) may interact with a user of client computer system 140 (e.g., a client). In this instance, the user of target computer system 130 may request the user of client computer system 140 to authorize transmission of location information to data stores 110 for subsequent processing. Subsequently, the location information associated with the user of client computer system 140 is transmitted to data stores 110. Accordingly, a new enriched client profile 136 is generated based, at least in part, on the retrieved location information associated with the user of client computer system 140. In this embodiment, client computer system 140 interacts with target computer system 130 to establish communication between a user of client computer system 140 and a user of target computer system 130. Client computer system 140 can be can be a desktop computer, laptop computer, specialized computer server, or any other computer system known in the art. In general, client computer system 140 is representative of any electronic device, or combination of electronic devices, capable of executing machine-readable program instructions, as described in greater detail with regard to FIG. 4. In one embodiment, client computer system 140 is a portable electronic device, in which case a user of client computer system 140 uses client computer system 140 to interact (e.g., phone call or instant message) with a user of target computer system 130 via network 120.

FIGS. 2A-2F are diagrams that each illustrate a visual representation (e.g., avatar 200) of information associated with a user of client computer system 140, in accordance with an embodiment of the present invention. In this embodiment, the information associated with the user of client computer system 140 (e.g., characteristics) stored in data stores 110 are translated into one or more visual indicators. As discussed in greater detail later in this specification, service application 134 uses a translation map stored in data stores 110 to identify one or more visual indicators that correspond to characteristics of the user of client computer system 140. Enriched client profile 136 is presented to a user of target computer system 130 responsive to the user of target computer system 130 establishing an interaction with the user of client computer system 140.

Figures 2A, 2D:
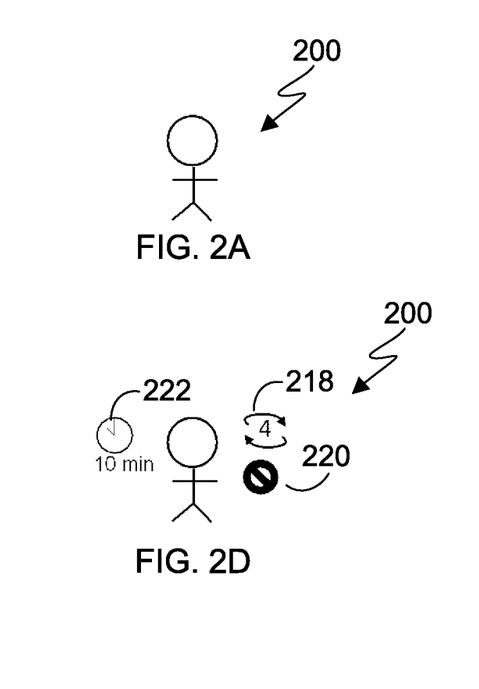
FIGS. 2A-2F are diagrams illustrating a visual representation of characteristics of a user of a client computer system, in accordance with an embodiment of the present invention.

FIG. 2A illustrates avatar 200, in accordance with an embodiment of the present invention. In this embodiment, avatar 200 is a visual representation of the user of client computer system 140. In other embodiments, avatar 200 is modified using visual indicators based on one or more characteristics of the user of client computer system 140.

Figure 2B:
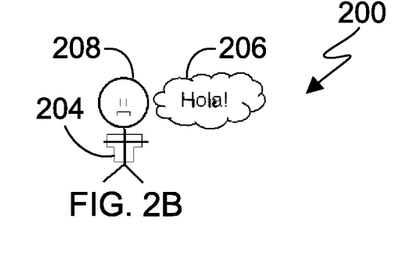

FIG. 2B illustrates avatar 200, in accordance with an embodiment of the present invention. In this embodiment, avatar 200 is enriched with visual indicator 204, visual indicator 206, and visual indicator 208 to create enriched client profile 136. In another embodiment, enriched client profile 136 may comprise a greater or lesser number of visual indicators. Visual indicator 204 depicts a shirt superimposed over avatar 200, wherein the shirt provides an indication of a location of the user of client computer system 140. For example, a national flag pattern may be a design of visual indicator 204. In this case, the visual indicator may be an image of a national flag, which is semantically related to the location of the user. Visual indicator 206 depicts a conversation bubble emitting from avatar 200, wherein the conversation bubble provides an indication of the preferred language spoken by the user of client computer system 140. For example, Spanish text within visual indicator 206 can indicate that the preferred spoken language of the user of client computer system 140 is Spanish. Visual indicator 208 depicts an emoticon superimposed over avatar 200, wherein the emoticon provides an indication of a current mood of the user of client computer system 140. For example, a frown face can be visual indicator 208 and may indicate that the user of client computer system 140 is currently unhappy. In general, visual indicators 204, 206, and 208 are visual indicators representing characteristics of the user of client computer system 140 (e.g., preferred spoken language, origin of call, mood of client, and other personal information from data stores 110).

Figure 2C:
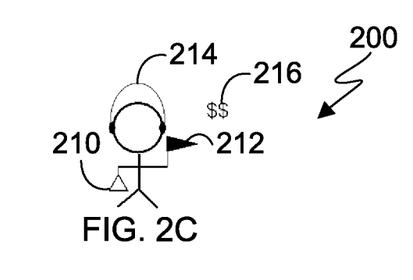

FIG. 2C illustrates avatar 200, in accordance with an embodiment of the present invention. In this embodiment, avatar 200 is enriched with visual indicator 210, visual indicator 212, visual indicator 214, and visual indicator 216 to create enriched client profile 136. In another embodiment, enriched client profile 136 may comprise a greater or lesser number of visual indicators. Visual indicator 210 depicts a shopping bag held by avatar 200, wherein the shopping bag provides an indication that the user of client computer system 140 frequently shops. Visual indicator 212 depicts a pennant held by avatar 200, wherein the pennant provides an indication that the user of client computer system 140 enjoys sporting events. Visual indicator 214 depicts a pair of headphones worn by avatar 200, wherein the pair of headphones provides an indication that the user of client computer system 140 enjoys listening to music. Visual indicator 216 depicts an icon located near avatar 200, wherein the icon indicates an application that the user of client computer system 140 frequently uses. In general, visual indicators 210, 212, 214, and 216 are visual indicators representing different characteristics of the user of client computer system 140 (e.g., lifestyle choices, hobbies, personal preferences, and other personal interest information from data stores 110).

FIG. 2D illustrates avatar 200, in accordance with an embodiment of the present invention. In this embodiment, avatar 200 is enriched visual indicator 218, visual indicator 220, and visual indicator 222. In another embodiment, enriched client profile 136 may comprise a greater or lesser number of visual indicators. Visual indicator 218 depicts an icon located near avatar 200, wherein the icon indicates a number of times a user of client computer system 140 (i.e., a client) has interacted (e.g., called) with a particular user of target computer system 130 (i.e., customer service representative). For example, visual indicator 218 may indicate that four interactions have taken place between the user of client computer system 140 and the user of target computer system 130. Visual indicator 220 depicts another icon located near avatar 200, wherein the icon indicates a network or a connection status. For example, a cell-phone inside a "no-sign" can indicate that client computer system 140 is connected to target computer system 130 via a network connection (e.g., network 120) having low signal strength. Visual indicator 222 depicts another icon located near avatar 200, wherein the icon indicates a time metric related to the current call. For example, textual information coupled with the icon located near avatar 200 can indicate that the user of client computer system 140 has been on hold for 10 minutes. In another example, visual indicator 222 indicates the duration of the current call. In general, visual indicators 218, 220, and 222 are visual indicators representing different characteristics of the user of client computer system 140 (e.g., total hold time, number of interactions, network strength, and other call or interaction information).

Figure 2E:
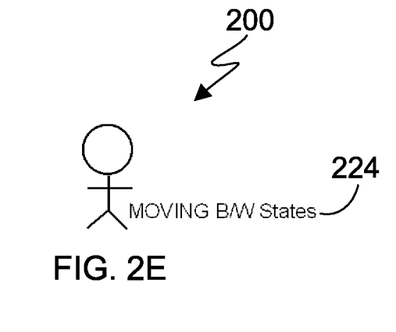

FIG. 2E illustrates avatar 200, in accordance with an embodiment of the present invention. In this embodiment, avatar 200 is enriched with text indicator 224. In another embodiment, enriched client profile 136 may comprise a greater or lesser number of visual indicators. Text indicator 224 depicts textual content located near avatar 200, wherein the textual content indicates a type of information based, at least in part on, the user of client computer system 140 and/or the user of target computer system 130. For example, text indicator 224 may be implemented if no visual indicator can be generated to represent different characteristics of the user of client computer system 140.

Figure 2F:
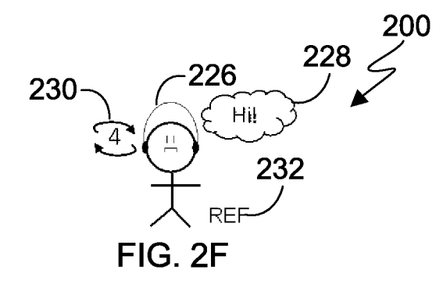

FIG. 2F illustrates avatar 200, in accordance with an embodiment of the present invention. In this embodiment, avatar 200 is enriched with visual indicator 226, visual indicator 228, visual indicator 230, and text indicator 232. In another embodiment, enriched client profile 136 may comprise a greater or lesser number of visual and text indicators. Visual indicator 226 indicates that the user of client computer system 140 enjoys listening to music. Visual indicator 230 indicates that four interactions (e.g., calls) have taken place between the user of client computer system 140 and the user of target computer system 130. Visual indicator 228 indicates that the preferred spoken language of the user of client computer system 140 is English. Text indicator 232 indicates non-graphic information based, at least in part, on the user of client computer system 140 and/or the user of target computer system 130. In general, avatar 200 may comprise any number of visual and text indicators that represent one or more types of information (e.g., personal interests, client-service relationships, network status, current call information, and combinations thereof) to create enriched client profile 136. Furthermore, the number of visual and text indicators are dynamic such that objects may interact with one another, and can be adjusted (e.g., size, location, opacity) as well as removed and/or added.

Figure 3:
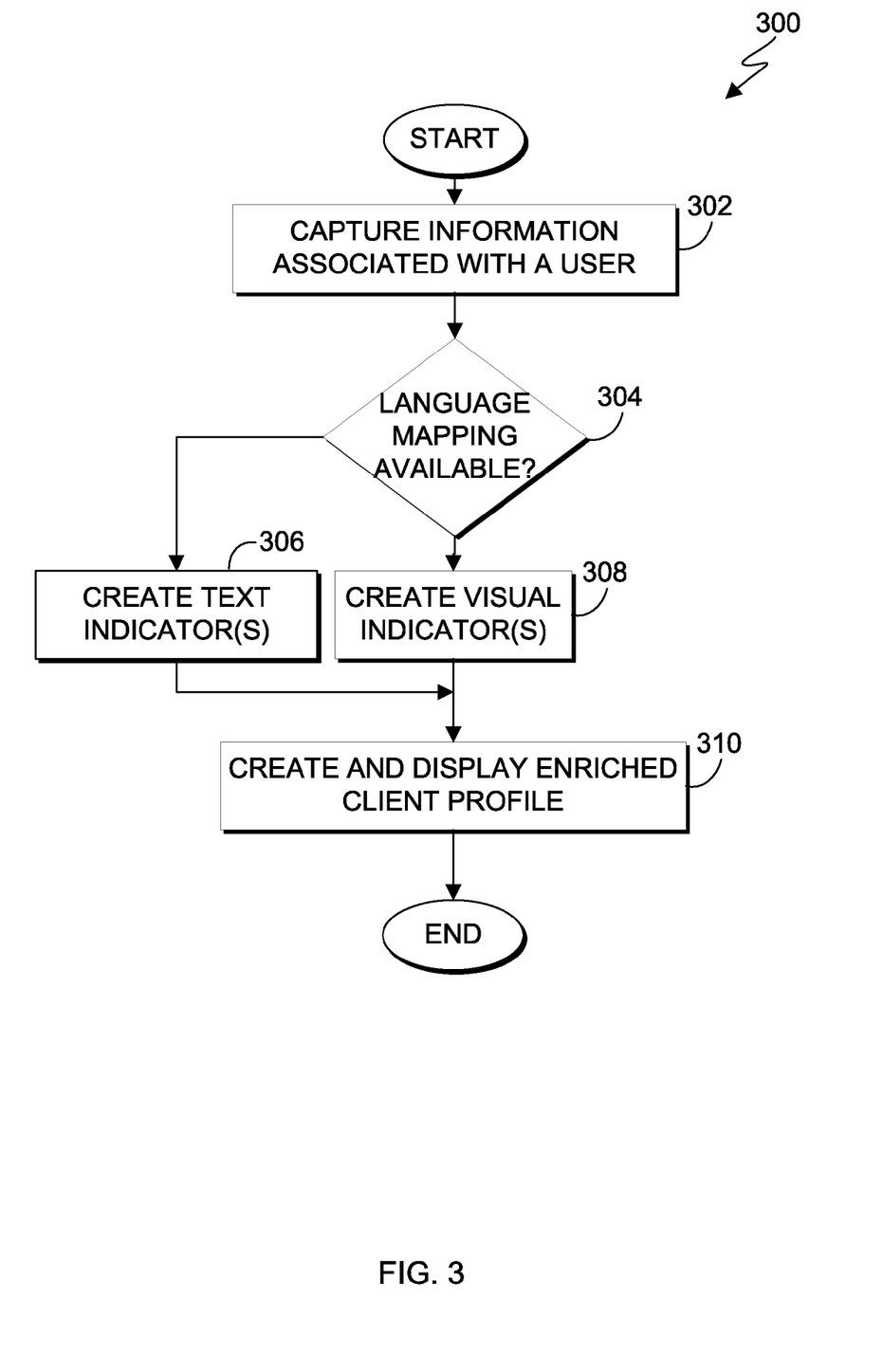
FIG. 3 is a flowchart illustrating operational steps for creating an enriched client profile, in accordance with an embodiment of the present invention.

FIG. 3 is flowchart 300 illustrating operational steps for generating enriched client profile 136, in accordance with an embodiment of the present invention. In this embodiment, target computer system 130 and client computer system 140 interact with data stores 110 via network 120. Subsequently, target computer system 130 identifies information associated with a user of client computer system 140 and translates the identified information into one or more visual indicators. Accordingly, target computer system 130 generates enriched client profile 136 using an avatar (e.g., avatar 200) enriched with the one or more translated visual indicators. In this embodiment, target computer system 130 automatically identifies information associated with the user of client computer system 140 based on a predetermined setting. In another embodiment, a user of target computer system 130 may elect to include additional and/or remove information to be translated, as described in greater detail herein.

In step 302, service application 134 communicates with data retrieval component 132 to capture information associated with a user of client computer system 140. The information to be captured by data retrieval component 132 is stored in data stores 110. In this embodiment, service application 134 automatically communicates with data retrieval component 132 to capture the information responsive to establishing an interaction between a user of target computer system 130 and the user of client computer system 140. For example, service application 134 indicates to data retrieval component 132 to capture personal information, network information, and call history information to create enriched client profile 136. In another embodiment, the user of target computer system 130 specifies when to capture information associated with the user of client computer system 140. For example, the user of target computer system 130 may require additional information associated with the user of client computer system 140. Furthermore, service application 134 may also specify a refresh frequency for information stored in data stores 110. For example, a user of client computer system 140 may call a user of target computer system 130. In this example, service application 134 may determine that the information stored in data stores 110 that is associated with the user of client computer system 140 is not up to date. In this instance, service application 134 may request to update data stores 110 with refreshed information associated with the user of client computer system 140 prior to capturing the information for subsequent processing. For illustrative purposes, it should be understood that more than one enriched client profile 136 can be created during an interaction between the user of client computer system 140 and the user of target computer system 130. In general, data retrieval component 132 automatically and/or semi-automatically (via user input) retrieves information associated with the user of client computer system 140 to create enriched client profile 136. In some embodiments, service application 134 may perform some or all of operations of flowchart 300 in response to an update to the information associated with the user of client computer system 140.

In step 304, service application 134 determines whether language mapping is available. In this embodiment, service application 134 uses a translation map stored in data stores 110 and the captured information to determine whether the stored translation map allows generation of one or more visual indicators. As previously discussed, the translation map may comprise one or more tables that associate late characteristics describing the user of client computer system 140 with one or more visual indicators.

If, in step 304, service application 134 determines that language mapping is unavailable, then in step 306, service application 134 creates one or more text indicators to describe the enriched information associated with the user of client computer system 140. For example, service application 134 may analyze the captured information and the translation map and determine that one or more portions of the captured information cannot be translated using the stored translation map. In certain embodiments, service application 134 stores enriched information that could not be translated to create visual indicators for creating subsequent translation maps. In yet another embodiment, the user of target computer system 130 may be prompted with non-translated enriched information and, in this instance, the user of target computer system 130 may decide how to handle the non-translated enriched information. For example, the user of target computer system 130 may manually assign one or more visual indicators to the captured information.

If, in step 304, service application 134 determines that language mapping is available, then in step 308, service application 134 creates one or more visual indicators to describe the information associated with the user of client computer system 140 using the stored translation map and the captured information.

In step 310, service application 134 creates enriched client profile 136 based, at least in part, on the one or more created text indicators and/or the one more created visual indicators. As previously discussed, in this embodiment, enriched client profile 136 comprises an avatar that is enriched with at least one visual indicator and/or textual indicator. In this embodiment, the created enriched client profile 136 that may be presented to a user of target computer system 130 may reduce the AHT of an interaction between the user of client computer system 140 and the user of target computer system 130. The AHT may be reduced because characteristics of the user of client computer system 140 and information associated with the interaction have an increased ease of access and readability. Accordingly, the user of target computer system 130 can provide a faster response time (i.e., reduced AHT) using visualization of information provided by enriched client profile 136.

In certain embodiments, operational steps described in FIG. 3 may be repeated to create another enriched client profile 136 for one or more interactions between users of client computer system 140 and target computer system 130 or update a previously created enriched client profile 136. It should be understood, that operational steps described in FIG. 3 may be performed in any order enriched client profile 136 is generated, in accordance with an embodiment of the present invention.

Figure 4:
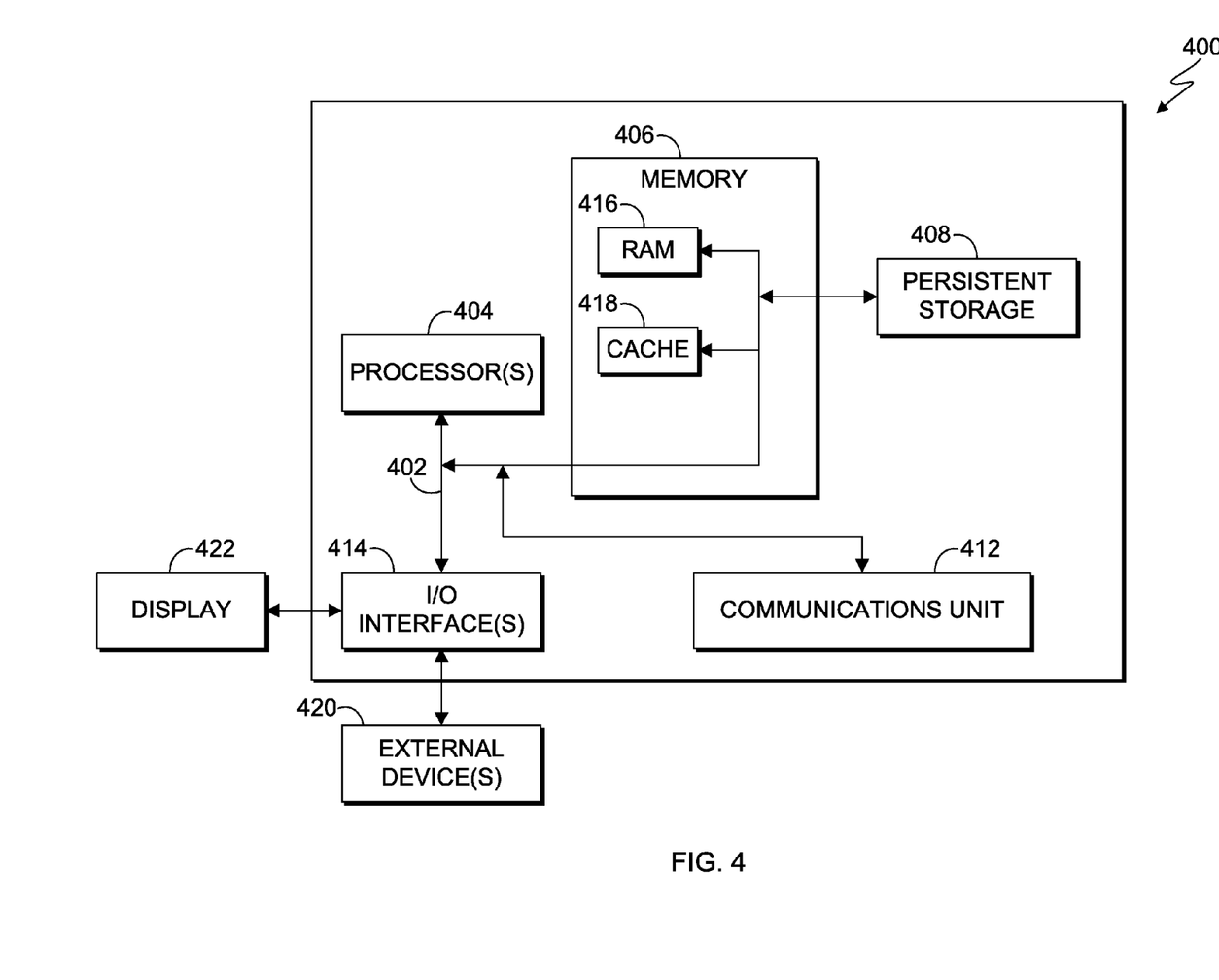
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   establishing, by one or more computer processors, a communication connection over a network between a user of a target computer and a user of a client computer, whereby the user of the target computer and the user of the client computer interact using the communication connection;
   responsive to establishing the communication connection, receiving, by the one or more computer processors, one or more characteristics of the user of the client computer from at least one of a plurality of data sources including the client computer;
   mapping, by the one or more computer processors, the one or more characteristics to one or more visual indicators using a translation map, wherein the translation map includes at least one table associating characteristics of the user of the client computer with visual indicators, and wherein the one or more visual indicators are visual representations of textual content describing the one or more characteristics;
   generating, by the one or more computer processors, a user profile for the user of the client computer including at least the visual indicator identified for the characteristic of the user of the client computer; and
   presenting, by the one or more computer processors, the user profile to the user of the target computer.

2. The method of claim 1, further comprising:
   responsive to determining that no visual indicator is identified for a characteristic of the one or more characteristics of the user of the client computer, generating, by the one or more computer processors, a text indicator including text describing the characteristic of the user of the client computer.

3. The method of claim 2, further comprising:
   responsive to generating the text indicator for the characteristic of the user of the client computer, updating, by the one or more computer processors, the user profile to include the text indicator.

4. The method of claim 1, further comprising:
   receiving, by the one or more computer processors, one or more updated characteristics of the user of the client computer, wherein the one or more updated characteristics are received after the user profile is presented to the user of the target computer;
   responsive to receiving the one or more updated characteristics of the user of the client computer, updating, by the one or more computer processors, the user profile to include visual indicators identified for the one or more updated characteristics; and
   presenting, by the one or more computer processors, the user profile to the user of the target computer including the visual indicators identified for the one or more updated characteristics.

5. The method of claim 1, wherein the user profile is an avatar of the user of the client computer including the one or more visual indicators superimposed over at least a portion of the avatar.

6. A computer program product comprising:
   one or more computer readable storage media and program instructions stored on the one or more computer readable storage media, the program instructions comprising:
   program instructions to establish a communication connection over a network between a user of a target computer and a user of a client computer, whereby the user of the target computer and the user of the client computer interact using the communication connection;
   program instructions to, responsive to establishing the communication connection, one or more characteristics of the user of the client computer from at least one of a plurality of data sources including the client computer;
   program instructions to map the one or more characteristics to one or more visual indicators using a translation map, wherein the translation map includes at least one table associating characteristics of the user of the client computer with visual indicators, and wherein the one or more visual indicators are visual representations of textual content describing the one or more characteristics;

program instructions to generate a user profile for the user of the client computer including at least the visual indicator identified for the characteristic of the user of the client computer; and program instructions to present the user profile to the user of the target computer.

7. The computer program product of claim 6, wherein the program instructions stored on the one or more computer readable storage media further comprise:

program instructions to, responsive to determining that no visual indicator is identified for a characteristic of the one or more characteristics of the user of the client computer, generate for the one of the one or more characteristics of the user of the client computer, a text indicator including text describing the characteristic of the user of the client computer.

8. The computer program product of claim 7, wherein the program instructions stored on the one or more computer readable storage media further comprise:

program instructions to, responsive to generating the text indicator for the characteristic of the user of the client computer, update the user profile to include the text indicator.

9. The computer program product of claim 6, wherein the program instructions stored on the one or more computer readable storage media further comprise:

program instructions to receive one or more updated characteristics of the user of the client computer, wherein the one or more updated characteristics are received after the user profile is presented to the user of the target computer;

program instructions to, responsive to receiving the one or more updated characteristics of the user of the client computer, update the user profile to include visual indicators identified the one or more updated characteristics; and program instructions to present the user profile to the user of the target computer including the visual indicators identified for the one or more updated characteristics.

10. The computer program product of claim 6, wherein the user profile is an avatar of the user of the client computer including the one or more visual indicators superimposed over at least a portion of the avatar.

11. A computer system comprising:

one or more computer processors;

one or more computer readable storage media;

program instructions stored on the one or more computer readable storage media for execution by at least one of the one or more processors, the program instructions comprising:

program instructions to establish a communication connection over a network between a user of a target computer and a user of a client computer, whereby the user of the target computer and the user of the client computer interact using the communication connection;

program instructions to, responsive to establishing the communication connection, one or more characteristics of the user of the client computer from at least one of a plurality of data sources including the client computer;

program instructions to map the one or more characteristics to one or more visual indicators using a translation map, wherein the translation map includes at least one table associating characteristics of the user of the client computer with visual indicators, and wherein the one or more visual indicators are visual representations of textual content describing the one or more characteristics;

program instructions to generate a user profile for the user of the client computer including at least the visual indicator identified for the characteristic of the user of the client computer; and program instructions to present the user profile to the user of the target computer.

12. The computer system of claim 11, wherein the program instructions stored on the one or more computer readable storage media further comprise:

program instructions to, responsive to determining that no visual indicator is identified for a characteristic of the one or more characteristics of the user of the client computer, generate for the one of the one or more characteristics of the user of the client computer, a text indicator including text describing the characteristic of the user of the client computer.

13. The computer system of claim 12, wherein the program instructions stored on the one or more computer readable storage media further comprise:

program instructions to, responsive to generating the text indicator for the characteristic of the user of the client computer, update the user profile to include the text indicator.

14. The computer system of claim 11, wherein the program instructions stored on the one or more computer readable storage media further comprise:

program instructions to receive one or more updated characteristics of the user of the client computer, wherein the one or more updated characteristics are received after the user profile is presented to the user of the target computer;

program instructions to, responsive to receiving the one or more updated characteristics of the user of the client computer, update the user profile to include visual indicators identified the one or more updated characteristics; and program instructions to present the user profile to the user of the target computer including the visual indicators identified for the one or more updated characteristics.

* * * * *